United States Patent [19]

Crabbe, Jr.

[11] Patent Number: 4,736,339
[45] Date of Patent: Apr. 5, 1988

[54] CIRCUIT FOR SIMPLEX I/O TERMINAL CONTROL BY DUPLEX PROCESSORS

[75] Inventor: Edwin P. Crabbe, Jr., Peoria, Ariz.

[73] Assignee: GTE Communication Systems Corporation, Phoenix, Ariz.

[21] Appl. No.: 808,975

[22] Filed: Dec. 16, 1985

[51] Int. Cl.[4] .................................. G06F 11/20
[52] U.S. Cl. .................... 364/900; 371/9; 371/11
[58] Field of Search ............... 371/8, 9, 11; 364/200 MS File, 900 MS File

[56] References Cited

U.S. PATENT DOCUMENTS

| 4,009,469 | 2/1977 | Boudreau et al. | 371/8 X |
| 4,012,717 | 3/1977 | Censier et al. | 371/9 X |
| 4,228,496 | 10/1980 | Katzman et al. | 364/200 |
| 4,387,426 | 6/1983 | Roberts | 364/200 |
| 4,532,594 | 7/1985 | Hosaka et al. | 371/11 X |

Primary Examiner—Eddie P. Chan
Attorney, Agent, or Firm—Frank J. Bogacz; Peter Xiahros

[57] ABSTRACT

This circuit provides for the connection of simplex I/O terminals to duplex processor copies. Each processor copy's configuration provides for a terminal control circuit. These copies of the terminal control circuit are cross connected in order to provide access from each processor to each I/O terminal. Normal operation consists of a particular I/O terminal being operated by one processor copy. If the processor copy corresponding to a particular terminal is faulty or removed from service, that terminal is then automatically cross-connected to the active processor copy and receives output from that processor copy. If one processor copy is out of service, both I/O terminals receive output from the active processor copy. If the I/O terminal which is normally connected to the active processor copy becomes out of service and the other processor copy is out of service, the I/O terminal which is normally connected to the other processor copy will be reconfigured to be connected to the active processor. The active processor will then accept input from the I/O terminal of the other copy as well as transmit output to that I/O terminal.

11 Claims, 1 Drawing Sheet

CIRCUIT FOR SIMPLEX I/O TERMINAL CONTROL BY DUPLEX PROCESSORS

BACKGROUND OF THE INVENTION

This invention pertains to data input/output by duplex processors and more particularly to simplex input/output terminal control by duplex processors.

Systems which require a high degree of reliability are often designed with a duplex processor pair and duplex bussing between the processors and the peripheral devices, such as input/output terminals. Duplication of I/O terminals is not practical, since it would be difficult for a system operator to enter the same data simultaneously on two different terminals. Therefore, some portions of reliable systems must be simplex, such as I/O terminals. An arrangement for connecting duplex processors to simplex I/O terminals is required.

Previous systems, such as processor controlled switching systems, use simplex I/O interface circuits. These interface circuits provide for connection to the simplex I/O devices and also to the duplex processor buses through dual ported circuitry. Signals from the processor or from an associated configuration control circuit are used to determine which bus copy will have access to the dual ported circuitry.

The draw back of such schemes is their complexity. Substantial configuration control circuitry is required. This circuitry along with the requisite software is often one of the most complex error prone circuits in a duplex system. In addition, a considerable amount of software must be dictated to control the configuration of the system's I/O terminals.

SUMMARY OF THE INVENTION

A duplex processor system has first and second processor copies. Each processor copy is connected to a corresponding receiver/transmitter. A circuit for controlling simplex I/O terminals is connected to the duplex processors.

A first terminal controller is connected to the first processor copy and to its corresponding receiver/transmitter. The first terminal controller operates to transmit data from and to the first processor copy. A second terminal controller is connected to the second processor copy and to its corresponding receiver/transmitter. The second terminal controller operates to transmit data to and from the second processor copy.

A first interface circuit is connected to the first terminal controller and to a first simplex I/O terminal. The first interface circuit operates in response to the first terminal controller to transfer data from the first processor copy to the first I/O terminal. The first interface circuit also transfers data from the first I/O terminal to the first processor copy.

A second interface circuit is connected to the second terminal controller and to a second simplex I/O terminal. The second interface circuit operates in response to the second terminal controller to transfer data from the second processor copy to the second I/O terminal. In addition, the second interface circuit transfers data from the second terminal to the second processor copy.

The first processor copy provides the first terminal controller with a first indicator signal which has a first value corresponding to the first processor copy being in service and the first indicator signal has a second value corresponding to the first processor copy being out of service. Similarly, the second processor copy provides a second indicator to the second terminal controller which has a first value corresponding to the second processor copy being in service and the second indicator signal has a second value corresponding to the second processor copy being out of service.

The first terminal controller is cross-connected to the second interface circuit. The first terminal controller operates in response to the second value of the second indicator to transmit data of the first processor copy to the second I/O terminal. The first terminal controller also receives data from the first I/O terminal. Lastly, the second terminal controller is cross-connected to the first interface circuit. The second terminal controller operates in response to the second value of the first indicator to transmit data from the second processor copy to the first I/O terminal. The second terminal controller also receives data from the second terminal.

A BRIEF DESCRIPTION OF THE DRAWINGS

DESCRIPTION OF THE PREFERRED EMBODIMENT

Figure 1:
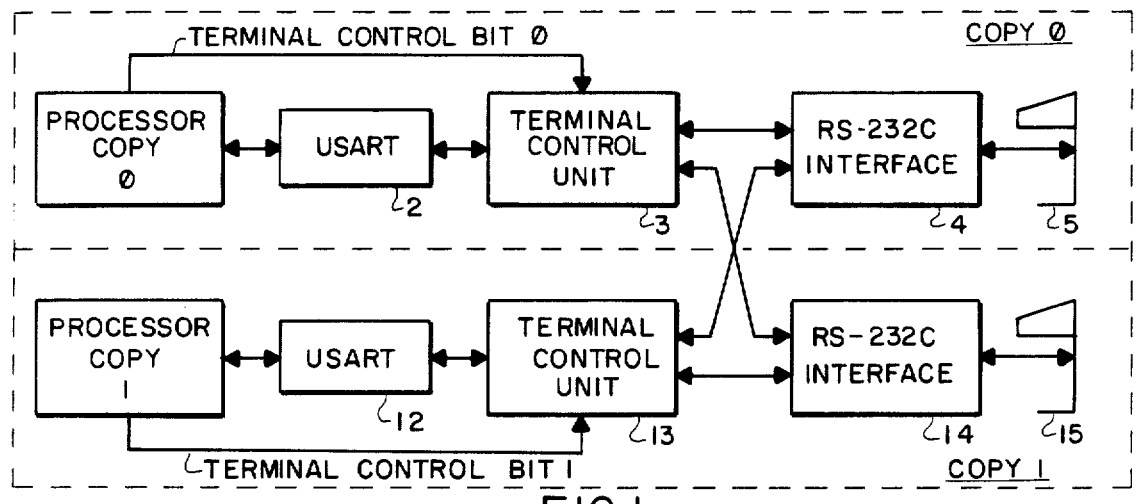
FIG. 1 is a block diagram of a duplex processor system for controlling simplex I/O terminals.

In FIG. 1, circuitry is shown for interconnecting I/O terminals to duplex processors. This circuitry is a part of the Data Management and Transmission Module (DMTM) designed and manufactured by GTE Communication Systems Corporation. The DMTM has dual processors, each performing the same function, but operating independently. This circuitry lends itself to automatic switching of the I/O terminals to the opposite processor for the currents of certain fault conditions.

Each copy, copy 0 and copy 1, includes a processor which is connected to a universal synchronous-asynchronous receiver-transmitter (USART). The processor is also connected to a terminal control circuit via a terminal control bit lead. The USART is connected to a corresponding terminal control circuit. The terminal control circuit is connected to a corresponding RS-232C interface and to the RS-232C interface of the other copy. Each RS-232C interface is connected a corresponding I/O terminal. The processor of each copy may be implemented with a microprocessor CPU.

In copy 0, processor copy 0 is connected to terminal control circuit 3 via the terminal control bit 0 lead. Processor copy 0 is also connected to USART 2, which in turn is connected to terminal control circuit 3. Terminal control circuit 3 is connected to RS-232C interface 4 and also to RS-232C interface 14. RS-232C interface 4 is connected to an I/O terminal device 5. I/O terminal device 5 may comrpise a teletypewriter or other input/output device.

In copy 1, processor copy 1 is connected to terminal control circuit 13 via the terminal control bit 1 lead. In addition, processor 1 is connected to USART 12, which in turn is connected to terminal control circuit 13. Terminal control circuit 13 is connected to RS-232C interface 14 and also to RS-232C interface 4. Lastly, RS-232C interface 14 is connected to an I/O terminal device 15. I/O terminal device 15 may comprise a teletypewriter or other input/output device.

Figure 2:
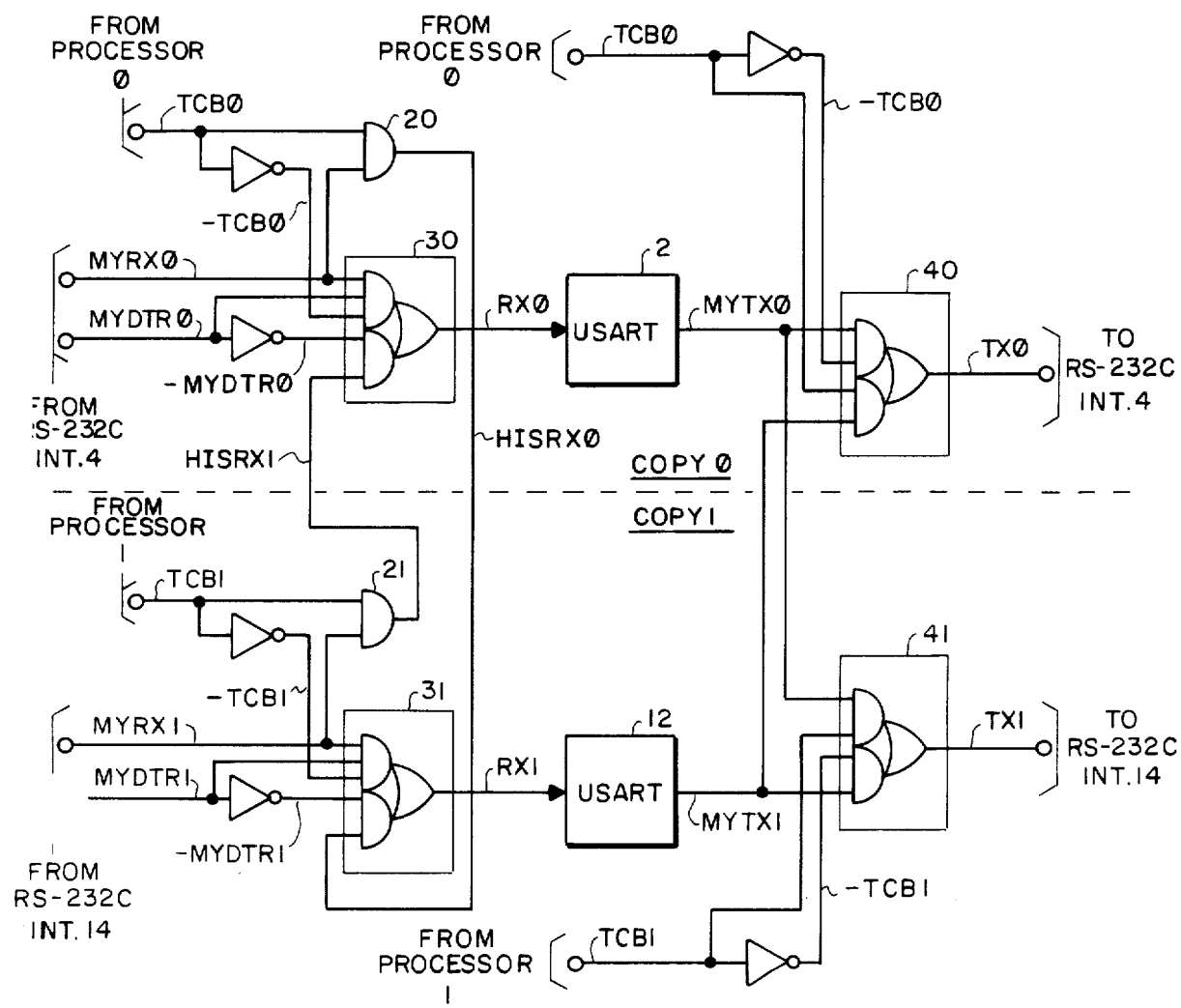
FIG. 2 is a schematic diagram of the terminal control circuits of FIG. 1.

Referring to FIG. 2, the details of terminal equipment control circuits 3 and 13 are shown in a schematic diagram. For terminal control circuit 3 (copy 0), processor 0 is connected via the terminal control bit (TCB0) lead to AND gate 20 and is connected through an inverter to the upper AND gate of combination AND-OR gate 30. RS-232C interface 4 is connected to the upper AND gate of combination gate 30 via the MYDTR0 lead and is connected through an inverter to an input of the lower AND gate of combination gate 30 via the −MYDTR0 lead. The DTR (Data Terminal Ready) signal is a standard output signal of an RS-232C interface which indicates that a terminal is connected to the associated port of an interface and is on-line.

Interface 4 is also connected to the upper AND gate of combination gate 30 and to AND gate 20 via the MYRX0 lead. The MYRX0 lead carries the data signals from the interface 4. The output of AND gate 20 is connected to an input to the lower AND gate of combination AND-OR gate 31. The output of combination gate 30 is connected to USART 2.

In FIG. 2, lead names with a prefix of "MY" indicate a signal from the associated copy's components. A lead name prefix of "HIS" indicates signals associated with the opposite copy's components.

For the transmit portion of copy 0, USART 2 is connected to the upper AND gate of combination AND-OR gate 40 via the MYTX0 lead. USART 2 is also connected to the upper AND gate of gate 41 via the MYTX0 lead. The TCB0 lead is connected between the processor copy 0 and an input of the lower AND gate of combination AND-OR gate 40 and is connected via an inverter to an input of the upper AND gate of gate 40. USART 12 is connected to an input of the lower AND gate of gate 40 via the MYTX1 lead. The output of gate 40 is connected to interface 4 via the TX0 lead.

For the receiver portion of copy 1, processor 1 is connected to AND gate 21 via the TCB1 lead and to an input of the upper AND gate of combination AND-OR gate 31 via an inverter and the −TCB1 lead. The receive data lead (MYRX1) of interface 14 is connected to another input of the upper AND gate of combination gate 31. The MYRX1 lead is also connected to an input of AND gate 21. The output of AND gate 21 is connected to an input of the lower AND gate of combination gate 30 via the HISRX1 lead.

The data terminal ready signal of interface 14 is connected to an input of the upper AND gate of combination gate 31 via the MYDTR1 lead and via an inverter to another input of the lower AND gate of combination gate 31 via the −MYDTR1 lead. The output of AND gate 20 is connected to an input of the lower AND gate of combination gate 31 via the HISRX0 lead. The output of gate 31 is connected to USART 12 via the RX1 lead.

For the transmit portion of copy 0, USART 12 is connected to an input of the lower AND gate combination gate 41 via the MYTX1 lead. The MYTX1 lead also connects USART 12 to an input of the lower AND gate of combination gate 40. The MYTX1 lead contains the data to be transmitted from processor 1 to interface 14.

The terminal control bit 1 (TCB1) lead connects processor 1 to an input of the upper AND gate of gate 41. Processor 1 is also connected via an inverter and the −TCB1 lead to another input of the lower AND gate of gate 41. The MYTX0 lead of USART 2 is connected to another input of the upper AND gate of gate 41. The output of gate 41 is connected to interface 14 via the TX1 lead.

Under normal operating conditions, the terminal control bit (TCB) of each processor is at a value of logic 0. Logic value 0 indicates that the associated processor is on-line active and not faulty. For processor copy 0 receiving data from interface 4, the data lead, MYRX0, is inhibited from transmission to copy 1 via AND gate 20, since TCB0 is at logic 0. If the corresponding data terminal 5 is ready and on line the MYDTR0 lead would be logic 1. The −TCB0 lead will also input a logic 1 to the upper AND gate of gate 30. As a result, the data signal MYRX0 will be gated through the upper AND gate of gate 30, through the OR gate to USART 2 via the RX0 lead. Since data terminal 5 was ready, the value of the −MYDTR0 lead will be logic 0. This will disable the lower AND gate of gate 30 from transmitting any data from interface 14 through gate 30 on the HISRX1 lead. Therefore, processor 0 will accept input only from terminal device 5.

Processor 0 will only accept input from terminal 15, if processor 1 is faulty or out of service (TCB1=1) and terminal 5 is out of service or faulty (MYDTR0=0). Thus, if one processor is out of service and the other processor's terminal device is out of service, the processor in service must transfer data between the opposite copy's terminal device for both input and output.

For the transmit portion, using copy 0 for an example, if TCB0=0, the data output of USART 2 is gated via the MYTX0 lead through the upper AND gate of gate 40 to interface 4 via the TX0 lead. If processor 1 is output of service or faulty, TCB0=1, the data output of USART 2 is inhibited from being transmitted via the MYTX0 lead through gate 40. In addition, the lower AND gate of gate 40 is enabled allowing the data output of USART 12 to be transmitted via the MYTX1 lead through gate 40 to interface 4 via the TX0 lead. Thereby, processor 1 is able to output on terminal 5.

The receiving and transmitting operations of copy 1 exactly parallel the previously discussed operations for copy 0. Reference the table given below.

TABLE

| COPY 0 | | COPY 1 | | |
| --- | --- | --- | --- | --- |
| TCB0 | MYDTR0 | TCB1 | MYDTR1 | CONFIGURATION |
| 0 | 1 | X | 0 | Terminal copy 0 is connected to and controlled by processor 0. |
| 1 | 1 | 0 | 0 | Terminal copy 0 is connected to processor 0, but controlled by processor 1. |
| 1 | 1 | 1 | 0 | Terminal copy 0 is connected to processor 0. Both processor copies are faulty, but processor 1 controls terminal copy 0. |
| 0 | 0 | 0 | 0 | No terminals available. If output is attempted by either processor, it will go to the associated |

TABLE-continued

| COPY 0 | | COPY 1 | | |
| --- | --- | --- | --- | --- |
| TCB0 | MYDTR0 | TCB1 | MYDTR1 | CONFIGURATION |
| | | | | terminal. No input is possible. |
| 1 | 0 | 0 | 0 | No terminals available. If output is attempted by processor 1, it will go to both ports. Input from the copy 0 terminal will be recognized by copy 1. |
| 1 | 0 | 1 | 0 | No terminals available, both processor copies are faulty. Processor 0 controls the terminal copy 1, and processor 1 controls the terminal on copy 0. |
| 0 | 1 | 0 | 1 | A terminal is connected to each processor. Each terminal is controlled by the processor to which it is connected. (Normal) |
| 0 | 1 | 1 | 1 | Processor 0 accepts input from the terminal connected to it and outputs to both terminals. |
| 1 | 1 | 1 | 1 | Terminal connected to both copies, both processor copies are faulty. The output from each processor goes to the opposite terminal. Input is not accepted by either processor from either terminal. |

Gates 30, 31, 40 and 41 may be implemented with integrated circuit part no. 7451 or 74S51.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a duplex processor system, including first and second processor copies means, each processor copy means being connected to corresponding receiver/transmitter means, a circuit for controlling simplex I/O terminals by said duplex processors, said circuit comprising:

first terminal control means connected to said first processor copy means and to said corresponding receiver/transmitter means, said first terminal control means being operated in response to a first processor signal to transmit data from said first processor copy means and to transmit data to said first processor copy means;

second terminal control means connected to said second processor copy means and to said corresponding receiver/transmitter means, said second terminal control means being operated in response to a second processor signal to transmit data from said second processor copy means and to transmit data to said second processor copy means;

first interface means connected to said first terminal control means and to a first simplex I/O terminal, said first interface means being operated in response to said first terminal control means to transfer said data from said first processor copy means to said first simplex I/O terminal and said first interface means being further operated to transfer said data from said first simplex I/O terminal to said first processor copy means;

second interface means connected to said second terminal control means and to a second simplex I/O terminal, said second interface means being operated in response to said second terminal control means to transfer said data from said second processor copy means to said second simplex I/O terminal and said second interface means being further operated to transfer said data from said second I/O terminal to said second processor copy means;

said connection of said first processor copy means to said first terminal control means including first indicating means for transmitting said first processor signal having a first value for said first processor copy means being in service and said first processor signal having a second value for said first processor copy means being out of service;

said connection of said second processor copy means to said second terminal control means including second indicating means for transmitting said second processor signal having a first value for said second processor copy means being in service and said second processor signal having a second value for said second processor copy means being out of service;

said first terminal control means connected to said second interface means, said first terminal control means being operated in response to said second value of said second processor signal to transmit said data of said first processor copy means to said second simplex I/O terminal and said first terminal control means being further operated to receive said data from said first simplex I/O terminal;

said connection of said first interface means to said first terminal control means including:
 first transmitting means;
 first receiving means;
 first data terminal ready means connected to said first terminal control means and being operated to transmit to said first terminal control means a first data terminal ready signal of the first value for said first simplex I/O terminal being out of service and to transmit said first ready signal of a second value for said simplex I/O terminal being in service;

said second terminal control means connected to said first interface means, said second terminal control means being operated in response to said second value of said first processor signal to transmit said data of said second processor copy means to said first simplex I/O terminal and said second terminal control means being further operated to receive said data from said second I/O terminal;

said connection of said second terminal control means to said second interface means including:
second receiving means;
second transmitting means;
second data terminal ready means connected to said second terminal control means and being operated to transmit to said second terminal control means a second data terminal ready signal of a first value for said simplex I/O terminal being out of service and to transmit said second ready signal of a second value for said simplex I/O terminal being in service.

2. A circuit for controlling simplex I/O terminals by duplex processors as claimed in claim 1, said first corresponding receiver/transmitter means including a universal synchronous-asynchronous receiver/transmitter (USART).

3. A circuit for controlling simplex I/O terminals by duplex processors as claimed in claim 2, said second corresponding receiver/transmitter means including a second universal synchronous-asynchronous receiver/transmitter (USART).

4. A circuit for controlling simplex I/O terminals by duplex processors as claimed in claim 3, said first terminal control means including:
first control receiving means connected to said first processor copy means via a first processor signal lead, to said first interface means via a first data terminal ready signal lead and via said first receiving means, to said first USART and to said second terminal control means; and
first control transmitting means connected to said first processor copy means via said first processor signal lead, to said first interface means via said first transmitting means and to said first USART.

5. A circuit for controlling simplex I/O terminals by duplex processors as claimed in claim 4, said first control receiving means including:
first gating means connected to said first processor copy means via said first processor signal lead and to said first receiving means and to said second terminal control means; and
second gating means connected to said first processor copy means via said first processor signal lead, to said first receiving means, to said first data terminal ready means, to said second terminal control means and to said first USART.

6. A circuit for controlling simplex I/O terminals by duplex processors as claimed in claim 5, said first control transmitting means including third gating means connected to said first USART, to said first processor copy means via said first processor signal lead, to said second terminal control means and to said first transmitting means.

7. A circuit for controlling simplex I/O terminals by duplex processors as claimed in claim 6, said second terminal control means including:
second control receiving means connected to said second processor copy means via a second processor signal lead, to said second data terminal ready means, to said second receiving means, to said first gating means, to said second gating means and to said second USART; and
second control transmitting means connected to said second USART, to said second processor means via said second processor signal lead, to said first USART, to said third gating means and to said second transmitting means.

8. A circuit for controlling simplex I/O terminals by duplex processors as claimed in claim 7, said second control receiving means including:
fourth gating means connected to said second processor copy means via said second processor signal lead, to said second receiving means and to said second gating means; and
fifth gating means connected to said second receiving means, to said second data terminal ready means, to said first gating means, to said second processor copy means via said second processor signal lead and to said second USART.

9. A circuit for controlling simplex I/O terminals by duplex processors as claimed in claim 8, said second control transmitting means including sixth gating means connected to said second USART, to said second processor copy means via said second processor signal lead, to said first USART and to said second transmitting means.

10. A circuit for controlling simplex I/O terminals by duplex processors as claimed in claim 9, said second gating means, said third gating means, said fifth gating means and said sixth gating means each include a dual AND-OR gate.

11. A circuit for controlling simplex I/O terminals by duplex processors as claimed in claim 10, said first gating means and said fourth gating means each include an AND gate.

* * * * *